United States Patent [19]
Elston

[11] Patent Number: 6,055,505
[45] Date of Patent: Apr. 25, 2000

[54] AUTOMATIC CUSTOMER NOTIFICATION SYSTEM AND METHOD

[75] Inventor: Mary B. Elston, Littleton, Colo.

[73] Assignees: U S West, Inc., Denver; MediaOne Group, Inc., Englewood, Colo.

[21] Appl. No.: 09/000,912

[22] Filed: Dec. 30, 1997

[51] Int. Cl.[7] .................................................. H04M 3/42
[52] U.S. Cl. ........................................................... 705/1
[58] Field of Search ........................... 705/1, 27; 379/157, 379/201, 67.1, 69, 88.02; 370/259

[56] References Cited

U.S. PATENT DOCUMENTS

| | | |
|---|---|---|
| 4,554,418 | 11/1985 | Toy ........................................ 379/88.01 |
| 5,428,679 | 6/1995 | French ................................... 379/201 |
| 5,576,951 | 11/1996 | Lockwood .............................. 705/27 |
| 5,581,600 | 12/1996 | Watts et al. ........................... 379/88.02 |
| 5,896,298 | 4/1999 | Richter .................................. 364/479.01 |

*Primary Examiner*—James P. Trammell
*Assistant Examiner*—Matthew Smithers
*Attorney, Agent, or Firm*—Brooks & Kushman

[57] ABSTRACT

A system and method is described for automatically notifying a customer of an event using a telecommunications system including configuring options corresponding to type of notification event, time for notification, and notification method; storing configured options; waiting until the notification event occurs; retrieving configured options; and notifying the customer through the telecommunications system at a time and with a method corresponding to the retrieved configured options.

14 Claims, 2 Drawing Sheets

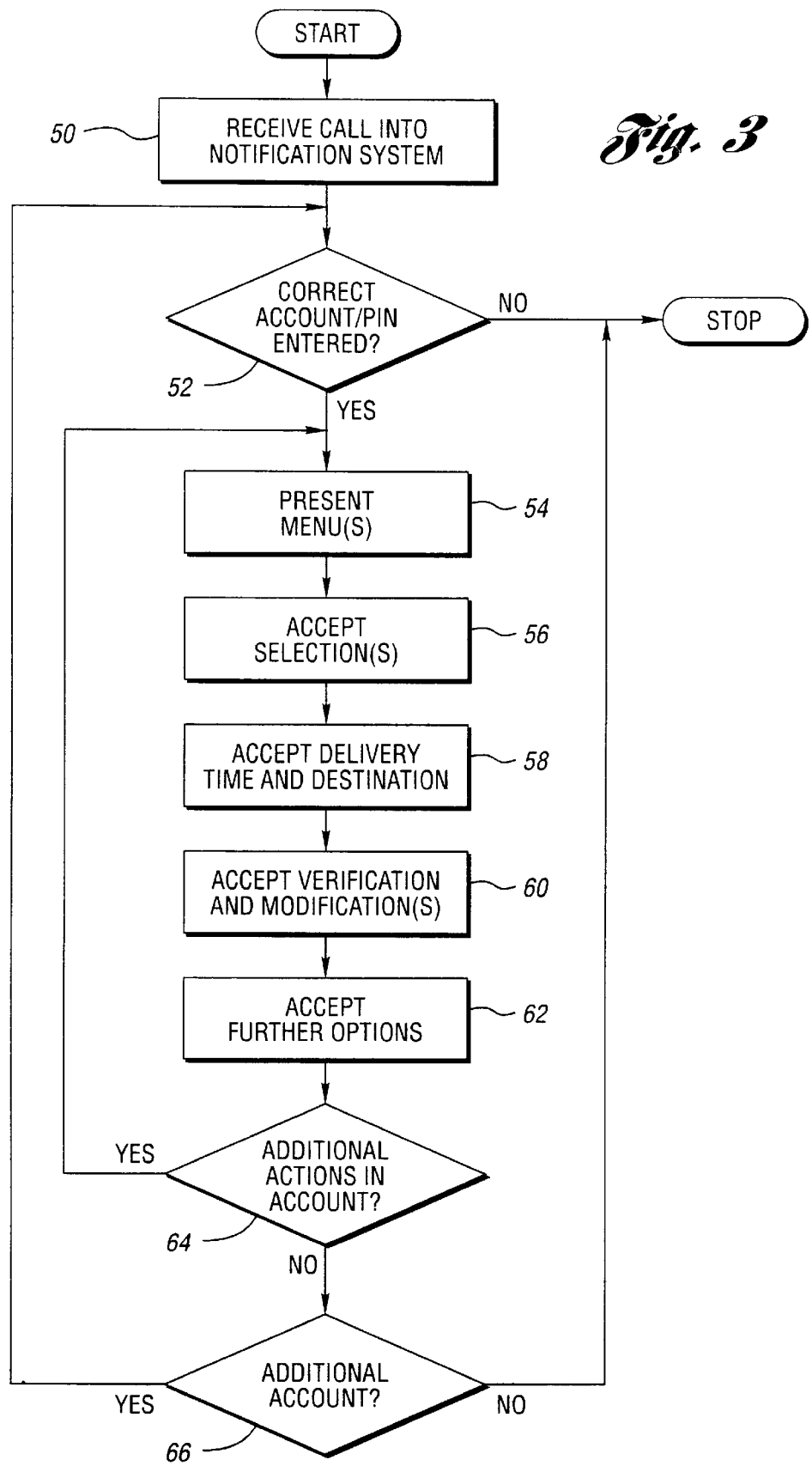

AUTOMATIC CUSTOMER NOTIFICATION SYSTEM AND METHOD

TECHNICAL FIELD

The present invention relates to using the telecommunications system to automatically notifying customers of a financial institution or other business when a specified event has occurred.

BACKGROUND ART

In the past, interactions between financial institutions (or other businesses) and their customers have taken place at branch offices, during banking hours, and with a limited number of customer options. As technology progresses and customer expectations rise, financial institutions are offering increased services through telephone and electronic transactions, extended hours of operation, and numerous service options. Customers need easy access to financial information, multiple access options, readily available information about financial products and services, financial advice, and financial services at a minimal cost. Convenience in financial services today requires customers to come to the bank through various channel options, including traditional branch offices, automated teller machines, call centers, access through personal computers, video kiosks, and electronic transactions.

When customers wish to obtain information, such as availability of payroll or social security funds, they may contact their financial institution numerous times. This may place a significant burden on call centers, branch offices and network servers. What is needed is a system for automatically notifying customers when significant events occur.

SUMMARY OF THE INVENTION

It is a primary object of the present invention to proactively notify a customer using the telecommunications system when an event specified by that customer occurs.

Another object of the present invention is to provide a means for allowing a customer or business to program what types of events will generate a notification, when the notification will occur, and what method of notification will be used.

Still another object of the present invention is to provide a means for businesses to deliver customer-tailored information about products and services.

A further object of the present invention is to lessen the burden on call centers or other employees.

In carrying out the above objects and other objects and features of the present invention, a method is provided for automatically notifying a customer of an event using a telecommunications system including configuring options corresponding to type of notification event, time for notification, and notification method; storing configured options; waiting until the notification event occurs; retrieving configured options; and notifying the customer through the telecommunications system at a time and with a method corresponding to the retrieved configured options.

In one embodiment, information on configured options and the successfulness of notification attempts can be gathered and reports describing the gathered information can be generated.

In another embodiment, product or service information can be delivered while the customer is being notified of an event.

A system is also provided in accordance with the present invention for notification of customers. The system includes a telephony interface, an interactive voice processor linked with the telephony interface, a database holding information covering customer accounts, a database holding notification information entered by the customer, and an application processor in communication with the interactive voice processor and the databases operative to carry out the present invention.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 3 is a flow diagram of an embodiment for option configuration according to the present invention.

BEST MODES FOR CARRYING OUT THE INVENTION

Figure 1:
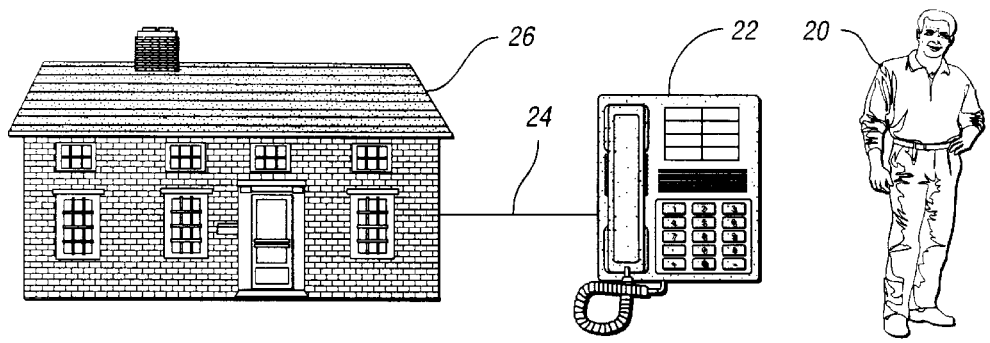
FIG. 1 is a block diagram of a customer, a business such as a financial institution, and a linking telecommunications system.

Referring now to FIG. 1, a block diagram of a customer, a business such as a financial institution, and linking telecommunications system is shown. Customer 20 has access to telephone 22. Telephone 22 is connected via phone system 24 to financial institution 26 or other business.

Currently, if customer 20 wishes to determine whether or not an event has occurred at financial institution 26, customer 20 must visit or call financial institution 26. Since calling is generally easier, a call center for financial center 26 may be flooded with requests for information. The present invention attempts to lessen the burden on call centers and other business personnel and provide convenience to customer 20 by automatically notifying customer 20 when a triggering event occurs.

Figure 2:
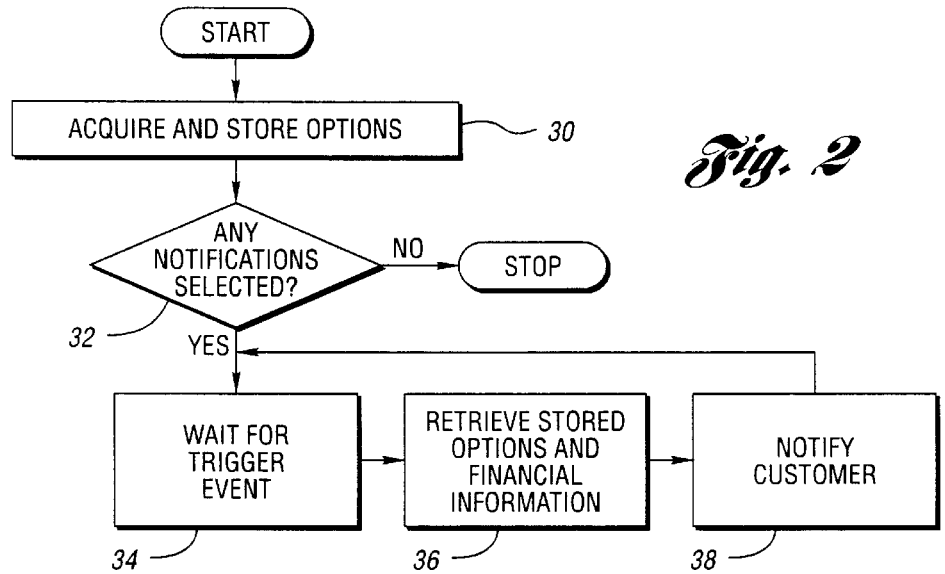
FIG. 2 is a flow diagram of an embodiment of the present invention.

Referring now to FIGS. 2 and 3, flow diagrams for embodiments of the present invention are shown. As will be appreciated by one of ordinary skill in the art, the operations illustrated in the flow diagrams are not necessarily sequential operations. The order of steps may be modified within the spirit and scope of the present invention. Similarly, operations may be controlled by software, hardware, or a combination of both. The present invention transcends any particular implementation and the embodiments are shown in sequential flow chart forms for ease of illustration.

Referring now to FIG. 2, a top-level flow diagram of an embodiment of the present invention is shown.

Options are configured 30. Customer 20 wishing to use the present invention first configures options including events, times, and destinations for notification. For example, customer 20 may want to be notified in the event that a social security check is deposited, between the hours of noon and 6:00 PM, and at a home telephone. Details of configuring options are described with regards to FIG. 3 below.

If, after configuring options, customer 20 has not elected to initiate notification, the method stops, as indicated by block 32. If customer 20 has elected to initiate notification, the method proceeds to block 34.

A trigger event is waited for 34. For example, a trigger event may be the deposit of a social security check in financial institution 26.

Stored options and financial information is retrieved 36. Once the triggering event occurs, the financial information specified by customer 20 as well as option information describing how and when the financial information is to be delivered are retrieved from one or more databases.

The customer is notified 38. Customer 20 receives notification of the event during the time and at the location specified during configuration. It is possible that customer 20 is not available to respond to a notification attempt, in which case the notification may be repeated. The option to repeat until successful or for a particular number of attempts may be set by customer 20 or by financial institution 26. Unsuccessful attempts as well as successful notification will be tracked for reporting.

In a preferred embodiment of the present invention, information describing financial institution products is also delivered with the notification. Product information may include but is not limited to descriptions of auto loan, mortgage, home equity loan, college loan, investment, high yield account, and certificates of deposit programs. Product information may be tailored to anticipated customer needs based on customer demographics.

In the embodiment shown in FIG. 2, the triggering event occurs periodically, and notification will continue until customer 20 or financial institution 26 switches of f notification. In another embodiment, one time events are configured, and notification is switched off following customer notification 36. In a preferred embodiment, both continuous and one time notification are available. Customer 20 and financial institution 26 also have the ability to disable notification at any time.

In a preferred embodiment, information is gathered about customer option selections as well as number and types of notification attempts. Reports describing this information may be retrieved by representatives of financial institution 26. One type of report is the exception report, indicating the number, time and method for unsuccessful attempts. Unsuccessful attempts may occur, for example, if customer 20 is not home to receive the all. Another type of report is the success report, indicating the time and method customer 20 was successfully notified.

Referring now to FIG. 3, a flow diagram of an embodiment for option configuration according to the present invention is shown.

A call is received into the notification system 50. When a call is received from customer 20, customer 20 is prompted for identification. In a preferred embodiment, a personal identification number (PIN) is requested. If, after several attempts, a valid PIN is not entered, the method stops as shown in block 52. If proper identification o is attained, the method continues with block 54.

At least one menu is presented 54. Options related to the type of notification are presented to customer 20. Types of events may include but are not limited to payroll deposit, social security deposit, investment update, loan or mortgage overdue, overdraft, and reserve account activation. Once a type is selected, additional information may be requested.

At least one notification type selection is accepted 56. Selections and entries by customer 20 are stored. The mechanism for detecting a triggering event is also notified.

Delivery time and destination are accepted 58. Customer 20 is prompted for a range of times and days during which notification can occur. Customer 20 is also prompted for at least one location to which notification will be sent. The location includes the notification medium. Possible media may include but are not limited to telephone, facsimile (FAX), pager, and electronic mail. The location may also include security options. For example, a person receiving a notification telephone call may have to correctly enter a password prior to being told the amount of deposit.

Verifications and modifications are accepted 60. Customer 20 is prompted to verify selection and delivery information. If the entries are not what was desired, customer 20 can modify settings.

Further options may be accepted 62. One additional option may be the language in which notification is delivered. Another additional option may be the number of notification attempts prior to giving up.

Customer 20 is prompted for further actions in the current account, as shown in block 64. If further actions are desired, menus are again presented to customer 20 as in block 54. If no further actions are desired, customer 20 is prompted to set up notification for a new account 66. If notification for a new account is desired, flow continues with checking the account and identification information shown in block 52. If customer 20 does not wish to set up notification for a new account, the method stops.

Figure 4:
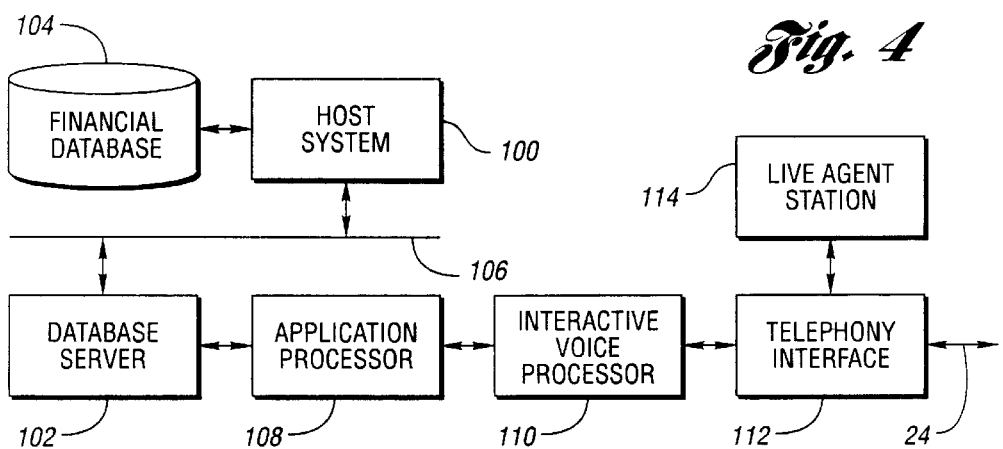
FIG. 4 is a block diagram of a system for implementing the present invention.

Referring now to FIG. 4, a block diagram of a system for implementing the present invention is shown. The system shown may reside in financial institution 26 and connect to customer equipment such as telephone 22 through telephone system 24.

Host system 100 is responsible for financial transaction processing. Account information such as transaction results are held in financial database 104. Financial database 104 holds financial information such as deposit amounts and times, loan and mortgage amounts and payment structures, and investment goals. In an embodiment of the present invention, financial database 104 is accessed through host system 100. Database server 102 controls access to financial database 104. In an embodiment of the present invention, database server 102 communicates with host system 100 through network 106.

Application processor 108 is in communication with database server 102 and is operative to process and store customer options, set triggers and respond to trigger events, and generate appropriate notification messages based on the customer options, trigger event and financial data. Customer options may be stored in financial database 104 and accessed through database server 102, may be stored in a separate database accessible by application processor 108, or by other means as are recognized by one of ordinary skill in the art.

Interactive voice processor 110 functions as a voice computer. Interactive voice processor 110 is capable of communicating with application processor 108 using standard computer communication protocols such as, for example, FTP and TCP/IP, in either real-time or batch modes. Interactive voice processor 110 is also capable of interacting with customer 20 through telephony equipment such as telephone 22 using touch tone and speech input and producing audio output. Interactive voice processor 110 connects to telephone system 24 through telephony interface 112.

In a preferred embodiment, live agent station 114 connects to telephony interface 112. Live agent station 114 allows customer 20 to communicate with a live individual when notified of the triggering event. The agent may provide assistance or additional information about products and services available to customer 20.

The best mode of the present invention describes notification of financial events. However, there are many applications of the present invention. For example, medical patients could use the present invention to be notified of test results. Parents could be notified when immunization shots are due. College students could be notified when grades are posted. Investors could be notified when a specified change has occurred in a stock, bond or commodity. There are many applications possible within the spirit and scope of the present invention.

While the best modes for carrying out the invention has been described in detail, those familiar with the art to which this invention relates will recognize various alternative designs and embodiments for practicing the invention as defined by the following claims.

What is claimed is:

1. A method for automatically notifying a customer of an event using a telecommunications system comprising:

receiving customer selected options corresponding to type of notification event, time for notification, and notification method;

waiting until the event occurs;

generating product information tailored to the customer; and notifying the customer of the event through the telecommunications system at a time and with a method corresponding to the received options, the notification including the product information.

2. A method for automatically notifying a customer as in claim 1 further comprising:

gathering information on options and on the successfulness of notification attempts; and generating reports describing the gathered information.

3. A method for automatically notifying a customer as in claim 1 wherein generating product information is based on customer demographics.

4. A method for automatically notifying a customer as in claim 1 wherein the product information comprises financial services.

5. A method for automatically notifying a customer as in claim 1 wherein the event is a periodic event, the method further comprising repeating waiting until the notification event occurs, generating product information, and notifying the customer.

6. A method for automatically notifying a customer as in claim 1 further comprising allowing the customer to connect to a live agent station during notification.

7. A method for automatically notifying a customer as in claim 1 wherein notification occurs within a time period specified in the customer selected options.

8. A system for automatically notifying a customer of an event using a telecommunications system comprising:

a telephony interface in communication with the telecommunications system;

an interactive voice processor in communication with the telephony interface;

a first database holding account information for the customer wherein a change in an element of account information is a notification event;

a second database holding option information entered by the customer; and an application processor in communication with the interactive voice processor, the first database, and the second database, the application processor operative to (a) accept option information corresponding to type of notification event, time for notification, and notification method as entered by the customer, (b) store the option information in the second database, (c) wait until the notification event occurs, (d) retrieve option information from the second database, (e) retrieve account information from the first database, (f) generate product information tailored to the customer, and (g) notify the customer of the account information through the telecommunications system at a time and with a method corresponding to the retrieved options, the notification including the generated product information.

9. A system for automatically notifying a customer as in claim 8 further comprising a live agent station in communication with the telephony interface, wherein the live agent station is operative to allow the customer to access additional information.

10. A system for automatically notifying a customer as in claim 8, the application processor further operative to gather information on configured options and on the successfulness of notification attempts and to generate reports describing the gathered information.

11. A system for automatically notifying a customer as in claim 8 wherein the application processor generates product information based on customer demographics.

12. A system for automatically notifying a customer as in claim 8 wherein the product information comprises financial services.

13. A system for automatically notifying a customer as in claim 8 wherein the event is a periodic event, the application processor further operative to repeatedly retrieve option information, retrieve account information, generate product information, and notify the customer.

14. A system for automatically notifying a customer as in claim 8 wherein the option information comprises a time range in which notification can occur, the application processor further operative to notify the customer within the time range.

* * * * *